United States Patent [19]
Bertheas

[11] 3,835,448
[45] Sept. 10, 1974

[54] MULTIBEAM STEERING SYSTEM FOR A CIRCULAR SECTION ACOUSTIC TRANSDUCER ARRAY

[75] Inventor: Jean Bertheas, Paris, France
[73] Assignee: Thomson-CSF, Paris, France
[22] Filed: Apr. 19, 1973
[21] Appl. No.: 352,717

[30] Foreign Application Priority Data
May 10, 1972   France .............................. 72.16758

[52] U.S. Cl. ........................... 340/6 R, 343/100 SA
[51] Int. Cl. ........................... G01s 3/80, G01s 7/52
[58] Field of Search .......... 340/3 R, 5 R, 6 R, 16 R; 343/100 SA

[56] References Cited
UNITED STATES PATENTS

| | | | |
|---|---|---|---|
| 3,370,267 | 2/1968 | Barry .................................. | 340/6 R |
| 3,555,498 | 1/1971 | Nye et al. ........................... | 340/3 R |
| 3,676,839 | 7/1972 | Wohl et al. ......................... | 340/6 R |

Primary Examiner—Richard A. Farley
Attorney, Agent, or Firm—Oblon, Fisher, Spivak, McClelland & Maier

[57] ABSTRACT

A system for the accurate multibeam steering, prior to the beams forming by electronic means, of a circular-section acoustic transducer array.

The electric signals derived from transducers aranged in columns are processed and multiplexed in time-division fashion using an electronic switch, then sampled at a variable frequency $F_1$ before being applied to an interpolation filter whose output is resampled at a fixed frequency $F_2$. The frequency $F_1$ is made variable in dependance of a setpoint value; the interval between these two frequencies $F_1$ and $F_2$ producing an offset between the instants of sampling, and thus making it possible to modify to beam steering.

The system is applicable to the multibeam steering and stabilisation in the azimuthal plane, of an acoustic transmit and/or receive transducer array.

5 Claims, 3 Drawing Figures

MULTIBEAM STEERING SYSTEM FOR A CIRCULAR SECTION ACOUSTIC TRANSDUCER ARRAY

The present invention relates to improvements in or relating to a multibeam steering system for a circular section acoustic transducer array with preformed transmit and/or receive beams. The invention relates in particular to submarine acoustic transducer arrays and its object is to provide accurate stabilisation, a priori and before the formation of any beams, of the Sonar image in relation to the inherent or relative movements of these transducer arrays. The invention can also be utilised for example to carry out accurate tracking of targets by means of circular-section transducer arrays.

Acoustic transducer arrays of this kind are designed with the possibility to use electrically controlled variable direction beams so that they can allow a satisfactory coverage for a continuous all-round scanning and surveillance of the submarine environment where there may be a target to be detected by a Sonar system.

To this end, it is known to utilise a fixed circular-section transducer array comprising several electro-acoustic transducers distributed about its circumference, in which the directional lobe of a reception beam is electrically controlled to sweep through 360° and detect a returning echo from an unpredictable direction, by systematic sequential scanning of the transducers.

Similarly, it is known to utilise a transducer array producing several simultaneous beams, or a transducer array with preformed beams, in which, simultaneously and continuously, adjacent directional lobes are produced making it possible to obtain a 360° coverage and detect all the arriving echoes.

A problem is posed by acoustic wave beams steering in such fixed transducer arrays and this problem has been the subject of a certain number of proposed solutions.

In the prior art, an U.S. Pat. No. 3,370,267 proposes a beam forming system for receive and/or transmit transducer array . . . utilizing a network of transducers belonging to a fixed transducer array; this system method consists in compensating, by means of appropriate delay circuits, the propagation delays between the signals arriving at the different transducers of the network or array. For each preselected direction, the value of these compensating delays is such that when a plane wave is received by the transducer array from a selected direction, all the signals received by the various transducers are synchronised with one another after compensation.

In addition, as indicated in the aforementioned patent, an article on this same subject has been written by V. C. Anderson under the heading "Digital Array Phasing" and published in July 1960 in "Journal of the Acoustical Society of America", volume 32, No. 7, pages 867 to 870. In the case in question, the signals received are previously clipped or digitalised and the propagation delay values are advantageously compensated using digital techniques. The compensating delays are then supplied by shift registers controlled by one and the same clock signal and each associated with their respective transducer. Each of these registers is made up of a succession of identical stages.

To form a beam in a given direction, it is merely necessary in this case to select a particular stage of each register and to sum the signals thus picked up. Any modification in the choice of the stages of each register, involves a corresponding modification in the orientation of the beam of the formed beam.

In addition, electronic scanning can be carried out in a manner known per se, by modifying the frequency of the clock signal controlling the shift registers, this having the effect of modifying each of the compensating delays and, consequently, orientating the beam which is formed.

Let one recapitulate here, some of the data which have to be taken into account.

If one considers an arrangement comprising a transducer rotating at an angular velocity V on a circle of radius R, when a plane wave of frequency $f_o$ arrives, the signal received by the rotating transducer will be frequency modulated: $f_1 = f_o(1 + (VR/c) \sin Vt)$ where $c$ is the velocity of the incident plane wave. This signal is furthermore amplitude modulated by the elementary directional pattern of the transducer. After this signal has been subjected to complex demodulation, that is to say transposition of its frequency spectrum about the frequency zero, it can be sampled at a frequency F defined by the Shannon sampling theorem as extended per complex signal, namely in this case:

$$F \geq 2 (VR/c) f_o.$$

The angular spacing between samples, on the circle of radius $R$ and corresponding to this frequency, is $c/2f_o R$, and this is equivalent to two points on the circle which are spaced by an arcuate interval equal to half a wavelength $\lambda/2 = c/2f_o$. Thus, the signal obtained by this kind of scanning, can be subjected to all the conventional processing techniques used in the temporal domain.

Accordingly, to form a single beam in a given direction, the signal supplied from the transducer can be injected into a matched filter which compensates for the phase modulation produced by the circular trajectory of the rotating transducer, and is followed by a sampler taking one sample per revolution of the transducer. By modifying the sampling moments in relation to the angular position of the transducer or vice versa, it is possible to continuously modify the steering of the beam thus formed.

However, this kind of system corresponds purely to a theoretical speculation because its pratical implementation cannot be achieved due to the fact that the transducer requires to be rotated at a speed very much higher than the velocity of the plane wave, this requirement resulting from the imposed frequency of the temporal sampling. In other words, in the case of a signal having a bandwidth B cycles per second which has been subjected to complex demodulation, the speed of rotation of the transducer would have to be at least of a value higher than B revolutions per second.

It is known to overcome this impossible condition by utilising a circular section transducer array comprising N columns of transducers in fixed positions, spaced from one another by at the most half a wavelength $\lambda/2$. Each column of transducers is connected to sampling circuits and beam forming circuits. Systems are also in existence, for example of the kind described in French Patent 1,569,897, in which an electronic switch makes it possible to transmit the signals from the transducers by time-division multiplex techniques, transducers being connected to a single matched filter.

However, a drawback of these systems is that their accuracy is determined by the number N of columns of transducers and the shift which it is possible to give a beam is incremental and equal to the pitch of the columns.

One object of the present invention is to provide an improved solution to this problem of beams steering, this solution overcoming the difficulties and drawbacks encountered by the known systems. The invention proposes to provide an accurate, continuous multibeam steering system which makes a circular section transducer array made up of N columns of transducers regularly spaced at intervals of half a wavelength $\lambda/2$, associated with an electronic switch controlled at the frequency $N.V./2\pi$ in cycles per second equivalent to an arrangement made up of a single transducer rotating at the angular speed V in radian per second.

In accordance with one feature of the present invention a multibeam steering system for a circular section acoustic transducer array composed of electro-acoustic transducers distributed at the periphery in N columns spaced from one another by half a wavelength of the mean operating frequency, which system, comprises:

an input processor for converting the N electrical signals . . . received from said transducers into signal complex components comprising two groups respectively of real parts X and imaginary parts Y, a master clock for producing a timing pilot signal of a predetermined frequency $F_o$, an operation control unit connected to said clock for producing control signals, on one hand, in a predetermined sequence of discrete signals . . . on the other hand one signal of variable frequency $F_1$ depending on a set point value C, and another of fixed frequency $F_2$ applied to signal transmission channels and further producing synchronising signals S applied to a beams-forming output processor, two parallel said signal transmission channels interconnecting said input processor outputs and said output processor inputs, each said channel comprising, in a series connection, a time-division multiplex system coupled by its inputs to receive respectively one of said complex part signals . . . under control of a discrete signal determined by said set point value C in said control signals predetermined sequence . . . a first sampling circuit actuated by said signal of variable frequency $F_1$, an analogue filter for carrying out interpolation between successively applied signals, a second sampling circuit actuated by said another signal of fixed frequency $F_2$ having a value equal or higher than the product of the number N of said transducer columns by the frequency band B of the propagated acoustic signals, and said output processor connected to the respective outputs of the second sampling circuits and to said operation control unit for beam forming.

Other features and advantages of the present invention will become apparent during the course of the ensuing description, given by way of example with reference to the attached figures in which.

Figure 1:
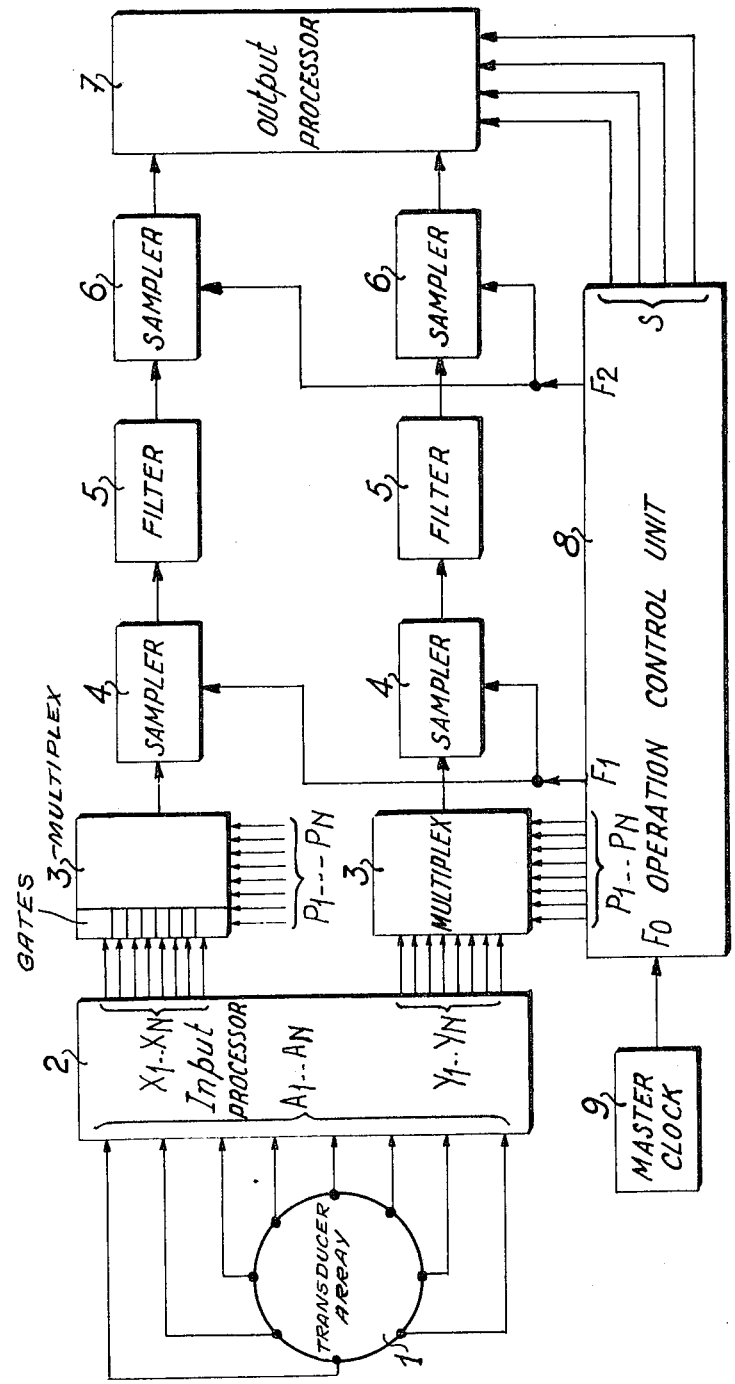
FIG. 1 is a block diagram of a system for the accurate steering of a directional lobe or lobes of an elastic wave of an acoustic transducer array in accordance with the present invention.

FIG. 1 illustrates a block diagram of a multi-beam steering system for aligning a directional lobe or lobes of an elastic wave, in accordance with the present invention. In the example chosen for this drawing and for the ensuing description, this system is associated with a receiving acoustic transducer array, one or more reception beams of which are to be steered or tranined in a continuous fashion, with high accuracy. This antenna 1 is of circular section kind and comprises N columns of electro-acoustic transducers regularly . . . spaced at a circular arcuate interval of half a wavelength $\lambda/2$ around the array circumference. From the N signals $A_1$ to $A_N$, which it receives from the transducer array 1, an input processor unit 2 produces two groups $X_1$ to $X_N$ and $Y_1$ to $Y_N$ of N signals each. Where this preliminary processing consists, in a manner known per se, of complex demodulation following filtering and preamplification, said two groups represent respectively the real X and the imaginary Y parts of the complex signals. To each group of N signals there is assigned an identical processing circuit comprising, first of all, a time-division multiplex system 3. In this multiplex system, each of the N signals of the group of input signals is applied to a separate anologue gate controlled by a discrete signal $P_1$ to $P_N$. The sequence of these control signals $P_1$ to $P_N$ is such that one and the same receiving column is passed cyclically every time $N/F_1$ where $1/F_1$ is the switching interval from one column to the next. The output of the multiplex system 3 is connected to a first sample and hold circuit controlled by a sampling frequency $F_1$ . . . . An . . . inter-column interpolation filter 5, consisting in a manner known per se of a low-pass filter having a cut-off frequency of less than half a fixed frequency $F_2$, making it possible to eliminate harmonics due to sampling, connects the output of said first sampling circuit 4 to the input of a second sample and hold circuit 6 controlled by a sampling frequency $F_2$, the output of this circuit being connected to a final processing and beam-forming system or output processor 7. This processor for example in the case where the signals picked up are of narrow bandwidth, that is to say with a ratio of the bandwidth of the picked up signals to the frequency of the incident waves, $B/f_o$, which is much less than unity, conventionnally comprises a time-compression correlator, the signal replica furnished by which corresponds to the amplitude and phase weighting law of the transducer array 1. Since this is well-known to those skilled in the art and of marginal significance where the object of the invention is concerned, the system 7 will not be described in detail here.

Figure 2:
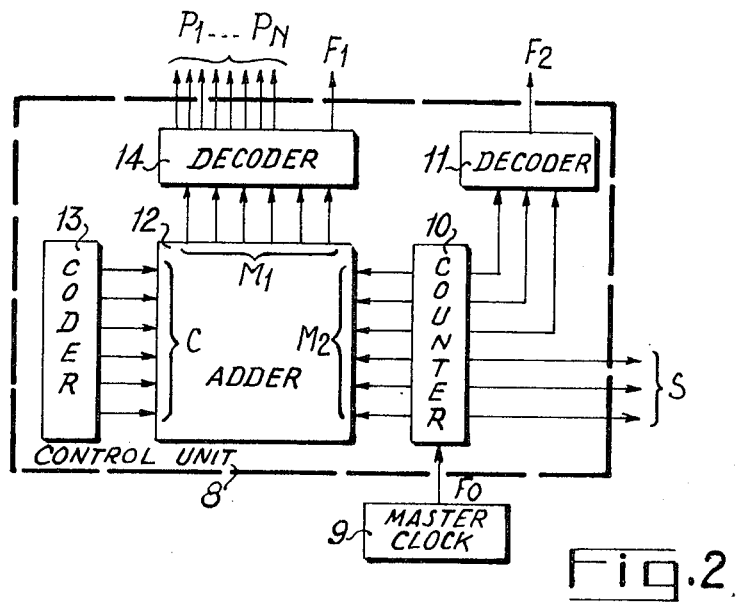
FIG. 2 is a block diagram of an operation control unit in accordance with the invention, supplying various control signals to the multibeam steering system.

The operation control signals, respectively $P_1$ to $P_N$, $F_1$ and $F_2$, of this steering system, as well as the signals for synchronising the beams formed by the processor 7, are furnished by an operation of a control unit 8, the block diagram of which is shown in FIG. 2. In this unit 8, a digital counter 10, for $m+p$ digits, is supplied from a stable master clock 9 of frequency $F_o = 2^m F_2$, m and p being positive integers such that $2^p$ represents the number of columns of transducers and $2^{m+p}$ the number of discrete angular positions which a beam can take within the 360° sweep. Said counter 10 will be referred to hereinafter as an "absolute counter". Its p output digits of highest weighting, are utilised as signals S for synchronising the processing system 7 whilst its $m$ digits of lower weighting, are utilised in a first decoding circuit 11, which determines the frequency $F_2$ of the control signal for the sampling circuit 6. This frequency $F_2$ is fixed and is made greater than the multiplication product $N \pm B$. The whole of the $m + p$ digits from said counter 10 are furthermore utilised to form a binary number $M_2$ applied to a binary adder 12 which is also supplied, from a coding circuit 13, with a binary set point value C, also coded in $m + p$ digits. The binary number $M_1$ resulting from the addition of the values C and $M_2$, is applied to a second decoding circuit 14 which produces the signals $P_1$ to $P_N$ for controlling the multiplex system 3, as well as the signal of frequency $F_1$ serving to control the sample and hold circuit 4.

The operation of modifying the steering of a beam is carried out by modifying the binary set point value C supplied to the adder 12. The times of control of the first sampler 4 are modified in a corresponding fashion whilst those of the second sampler 6 remain the same. Simultaneously, the timing of switching of the analogue gates of the multiplex system 3, are shifted by a number of periods of the signal $F_o$ produced by the clock 9, corresponding to the modification of the set point value C. This kind of operation in effect corresponds to modification of the speed of rotation of a rotating transducer ... and to sampling at a fixed frequency such as $F_2$, of the signal received by the transducer thus producing a shift of the formed beam by an angular value in radian which is a multiple of $2\pi/2^{m+p}$.

Figure 3:
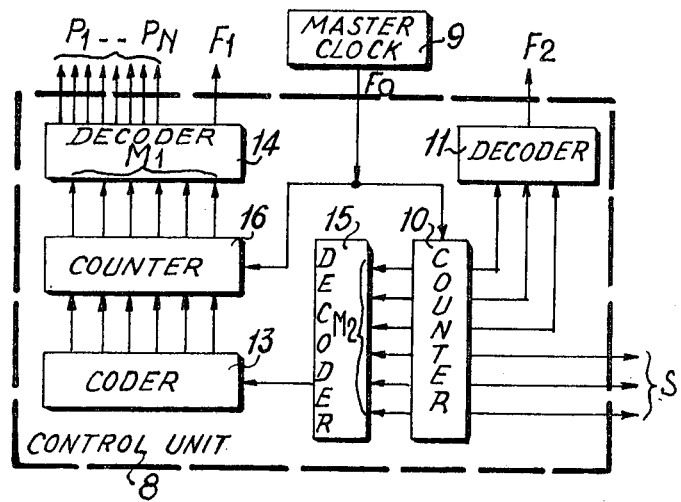
FIG. 3 is a variant embodiment of the diagram shown in FIG. 2, which enables azimuthal stabilisation of the steering in accordance with the present invention.

If it is desired to control the steering in accordance with a slowly varying set point value C, as is the case for example for azimuthal stabilisation which makes it possible to cancel yawing and slewing motions which might affect the transducer array, the operation control unit 8 of FIG. 1 can be designed in the manner shown in FIG. 3.

In this system the number $M_2$ supplied by the "absolute counter" 10 is applied to an intermediate decoding circuit 15. Each time this absolute counter 10 passes predetermined constant value, zero in the present instance, this decoder 15 controls transfer by the coding circuit 13 of the set point value C to a second counter 16, a so-called "relative counter" and also controlled by the clock 9. This counter 16, made of synchronisable trigger stages, is thus initiated with each scanning sweep of the transducer array, by the $m + p$ digits of the value C, which are applied to the preset input of the constituent trigger stages.

Where azimuthal stabilisation is involved, the set point value C is the bearing of the vehicle carrying the transducer array 1 quantized to $m + p$ digits. With each scanning sweep, that is to say every $N/F_2$ seconds, the control signals $P_1$ to $P_N$ for the multiplex system 3, and also the interval between the frequencies $F_1$ and $F_2$, are thus modified.

The foregoing description, has essentially dealt with a receiving transducer array system and it goes without saying that the invention applies in a similar fashion to a transmitting array of circular section design, equipped with electroacoustic transducers.

The transducer array system in accordance with the invention can also be utilised in the case when the number of transducers is not equal to an integer power of 2, provided that the whole of $m + p$ digits from the "absolute" counter 10, is applied at the same time to one of the circuits 12 or 15 in accordance with the design of the operation control unit used, to the first decoding circuit 11 used to produce the frequency $F_2$, and to a supplementary decoding circuit, not shown in the drawings, which is designed to produce the synchronising signals S for the processing system 7.

Of course, the invention is not limited to the embodiment described and shown which was given solely by way of example.

What is claimed is:

1. A multibeam steering system for a circular section acoustic transducer array composed of electro-acoustic transducers distributed at the periphery in N columns spaced from one another by half a wavelength of the mean operating frequency, which system, comprises:

an input processor (2) for converting the N electrical signals ($A_1$, --- $A_N$) received from said transducers into signal complex components comprising two groups respectively of real parts X and imaginary parts Y, a master clock (9) for producing a timing pilot signal of a predetermined frequency $F_o$, an operation control unit (8) connected to said clock for producing control signals, on one hand, in a predetermined sequence of discrete signals ($P_1$, --- $P_N$), on the other hand one signal of variable frequency $F_1$ depending on a set point value C, and another of fixed frequency $F_2$ applied to signal transmission channels and further producing synchronising signals S applied to a beam-forming output processor (7), two parallel said signal transmission channels interconnecting said input processor outputs to said output processor inputs, each said channel comprising, in a series connection, a time-division multiplex system (3) coupled by its inputs to receive respectively one of said complex part signals ($X_1$, --- $X_N$; $Y_1$, --- $Y_N$) under control of a descrete signal determined by said set point value C in said control signals predetermined sequence ($P_1$, --- $P_N$), a first sampling circuit (4) actuated by said signal of variable frequency $F_1$, a filter (5) for carrying out interpolation between successively applied signals, a second sampling circuit (6) actuated by said another signal of fixed frequency $F_2$ having a value equal or higher than the product of the number N of said transducer columns by the frequency band B of the propagated acoustic signals, and said output processor (7) connected to the respective outputs of the second sampling circuits (6) and to said operation control unit (8) for beam forming.

2. A system as claimed in claim 1, wherein each input of the multiplex system (3) comprises a separate analogue gate, the said first (4) and said second (6) sampling circuits being . . . of sample and hold type, and said interpolation filter (5) being a low-pass filter suppressing the harmonics due to sampling and having a cut-off frequency of less than half the said fixed frequency $F_2$.

3. A system as claimed in claim 1, wherein the operation control unit (8) comprises a digital counter (10) of $m + p$ digits receiving said timing pilot signal of a predetermined frequency $F_o$ equal to $2^m F_2$, $m$ and $p$ being positive integers such that $2^p$ represents said number N of columns of transducers and $2^{m+p}$ the number of discrete angular positions which a beam can take within the 360° sweep, the $p$ digits of highest weight from said counter constituting said synchronising signals S, the $m$ digits of lowest weight being applied to a first decoding circuit (11) producing said fixed frequency $F_2$, the whole of the $m + p$ digits constituting a binary number $M_2$ being furthermore applied to an adder (12) also supplied from a coder (13) with the binary set point value C likewise coded in $m + p$ digits and producing a binary number $M_1$ equal to $M_2+C$, which is applied to a second decoding circuit (14) generating said variable frequency $F_1$ and said discrete signals ($P_1 \ldots P_N$) the latter actuating the input gates to said multiplex systems (3).

4. A system as claimed in claim 3, in which said operation control unit provides azimuthal stabilisation, wherein the circuits producing the discrete control signals applied to said multiplex systems (3) and the variable frequency signal $F_1$, comprise, connected in series after said digital counter (10), an intermediate decoder (15) which, every time the counter passes a selected value, applies a signal transferring the set point values contained in said coder (13) to a so-called "relative" counter (16) made up of synchronisable trigger stages which receive said set point values at their respective preset inputs, and which receive said timing pilot signal $F_o$, at its counting input the output signals from the counter being applied to said second decoder (14).

5. A system as claimed in claim 4, for carrying out azimuthal stabilisation, wherein said set point valve is identical to the bearing of the vehicle carrying said transducer array (1) quantized with m+p digits; every scanning revolution of the transducer array the discrete control signals ($P_1 \ldots P_N$) applied to the multiplex systems (3) and the interval between the fixed ($F_2$) and variable ($F_1$) frequencies applied respectively to said samplers (6, 4), being thus modified as a function of variations in the bearing during a revolution.

* * * * *